(12) United States Patent
Nordström et al.

(10) Patent No.: US 10,787,130 B2
(45) Date of Patent: Sep. 29, 2020

(54) VEHICLE MOUNTED BICYCLE CARRIER

(71) Applicant: Thule Sweden AB, Hillerstorp (SE)

(72) Inventors: Simon Nordström, Hillerstorp (SE); Hannes Olaison, Falun (SE); Fredrik Larsson, Vaggeryd (SE); Simon Stråth, Jönköping (SE)

(73) Assignee: Thule Sweden AB, Hillerstorp (SE)

( * ) Notice: Subject to any disclaimer, the term of this patent is extended or adjusted under 35 U.S.C. 154(b) by 0 days.

(21) Appl. No.: 16/033,870

(22) Filed: Jul. 12, 2018

(65) Prior Publication Data

US 2019/0016270 A1    Jan. 17, 2019

(30) Foreign Application Priority Data

Jul. 14, 2017 (EP) .................................... 17181359

(51) Int. Cl.
   *B60R 9/048*    (2006.01)
   *B60R 9/10*     (2006.01)
   *B60R 11/00*    (2006.01)

(52) U.S. Cl.
   CPC ............... *B60R 9/048* (2013.01); *B60R 9/10* (2013.01); *B60R 2011/004* (2013.01)

(58) Field of Classification Search
   CPC ................................. B60R 9/048; B60R 9/10
   USPC .................................................. 224/319, 324
   See application file for complete search history.

(56) References Cited

U.S. PATENT DOCUMENTS 3,116,836 A * 1/1964 McCauley ............... B62H 3/08
                                                        211/21
4,524,893 A * 6/1985 Cole ........................ B60R 9/10
                                                         211/5
4,702,401 A * 10/1987 Graber ..................... B60R 9/10
                                                        224/323
4,852,779 A * 8/1989 Berg .................... B25H 1/0014
                                                       224/42.32
5,692,659 A * 12/1997 Reeves ..................... B60R 9/10
                                                        224/536
5,833,074 A * 11/1998 Phillips .................... B60R 9/10
                                                         211/21

(Continued)

FOREIGN PATENT DOCUMENTS

EP        2952387 A1 * 12/2015 ............. B60R 9/048

OTHER PUBLICATIONS

European Search Report from EP Application No. 17181359, dated Jan. 22, 2018.

*Primary Examiner* — Nathan J Newhouse
*Assistant Examiner* — Lester L Vanterpool
(74) *Attorney, Agent, or Firm* — Sterne, Kessler, Goldstein & Fox P.L.L.C.

(57) ABSTRACT

A vehicle mounted bike carrier comprising: a carrier member configured to support a bicycle, a supporting structure a bike supporting device comprising: a first wheel supporting member having a first end having a pivotal connection on the carrier member where the connection is configured to be positioned proximal to the rotational axle of a first bicycle wheel, and a second free end configured to support said bicycle wheel, a second wheel supporting member having a first end having a connection on the carrier member where the connection is configured to be positioned distal to the rotational axle of said first bicycle wheel and a second free end configured to support said bicycle wheel.

23 Claims, 8 Drawing Sheets

(56) References Cited

U.S. PATENT DOCUMENTS

| | | | | |
|---|---|---|---|---|
| 5,988,403 | A * | 11/1999 | Robideau | A47F 7/00 211/17 |
| 6,053,336 | A * | 4/2000 | Reeves | B62H 3/08 211/17 |
| 6,244,483 | B1 * | 6/2001 | McLemore | B60R 9/06 224/521 |
| 6,460,743 | B2 * | 10/2002 | Edgerly | B60R 9/048 224/324 |
| 6,491,195 | B1 * | 12/2002 | McLemore | B60R 9/06 224/521 |
| 6,868,998 | B2 * | 3/2005 | Dean | B60R 9/048 224/324 |
| 6,968,986 | B1 * | 11/2005 | Lloyd | B60R 9/06 224/504 |
| 7,104,430 | B2 * | 9/2006 | Reeves | B60R 9/06 224/504 |
| 7,264,145 | B2 * | 9/2007 | Lloyd | B60R 9/06 224/504 |
| 7,481,344 | B2 * | 1/2009 | Naslund | B60R 9/048 224/319 |
| 7,784,656 | B2 * | 8/2010 | Morrill | B60R 9/10 224/504 |
| 7,815,084 | B2 * | 10/2010 | Allen | B60R 9/06 224/537 |
| 7,857,177 | B2 * | 12/2010 | Reeves | B60R 9/10 224/403 |
| 8,113,398 | B2 * | 2/2012 | Sautter | B60R 9/10 224/497 |
| D672,704 | S * | 12/2012 | Grago | D12/408 |
| 8,763,870 | B2 * | 7/2014 | Davis | B60R 9/10 224/319 |
| 9,073,492 | B1 * | 7/2015 | Shen | B62H 3/04 |
| 9,610,993 | B1 * | 4/2017 | Ho | B62H 3/08 |
| 9,649,986 | B2 * | 5/2017 | Pedrini | B60R 9/10 |
| 9,956,922 | B2 * | 5/2018 | Phillips | B60R 9/06 |
| 10,239,465 | B2 * | 3/2019 | Kovarik | B60R 9/10 |
| 2003/0071097 | A1 * | 4/2003 | Dean | B60R 9/048 224/319 |
| 2005/0284905 | A1 * | 12/2005 | Naslund | B60R 9/048 224/319 |
| 2006/0029483 | A1 * | 2/2006 | Allen | B60R 9/06 410/30 |
| 2007/0000962 | A1 * | 1/2007 | Reeves | B60R 9/06 224/536 |
| 2007/0164065 | A1 | 7/2007 | Davis | |
| 2008/0073395 | A1 * | 3/2008 | Reeves | B60R 9/10 224/324 |
| 2011/0132946 | A1 * | 6/2011 | Sautter | B60R 9/10 224/324 |
| 2016/0068111 | A1 * | 3/2016 | Walker | B60R 9/06 224/521 |
| 2017/0197557 | A1 * | 7/2017 | Arvidsson | B60R 9/048 |
| 2017/0253189 | A1 * | 9/2017 | Kovarik | B60R 9/048 |
| 2017/0349112 | A1 * | 12/2017 | Rodriguez | B60R 9/10 |

\* cited by examiner

VEHICLE MOUNTED BICYCLE CARRIER

CROSS REFERENCE TO RELATED APPLICATION

This application claims priority to EP Application No. 17181359.5, filed Jul. 14, 2017, which is incorporated herein in its entirety by reference thereto.

FIELD

The use of sports equipment.

BACKGROUND

Load carriers for bicycles are well known within the arts of carrying different types of cargo on a vehicle. A bicycle is a relatively large item of sports equipment and the size of the bicycle often prevents it to be carried in the cargo hold of a vehicle or inside the cabin of a vehicle, especially when the vehicle is a conventional family car or a sports utility vehicle. Many of these bicycles may be disassembled and put into the cargo hold, or inside the cabin of the vehicle, but this solution is both complicated and time consuming for the person that wants to transport the bicycle.

For this purpose there have been designed a number of different types of load carriers that allow the bicycle to be carried on the outside of the vehicle, where the most common types of load carriers are roof mounted load carriers or rear mounted load carriers that are capable of holding and securing a bicycle to the vehicle, while maintaining a high security for the passengers of the vehicle as well as for other vehicles or pedestrians that encounter a vehicle mounted bicycle.

The choice of a specific type of load carrier for a bicycle may be highly dependent on the specific user or the specific user's needs. As an example, a rear mounted load carrier may be chosen for the simple mount of the bicycle to the vehicle. However, one of the drawbacks of using a rear mounted load carrier is that the bicycle mounted on the vehicle may block view for the driver in a rearwards direction, as the bicycle may be mounted just behind the rear window of the vehicle, especially when using a car. Furthermore, a rear mounted load carrier may also prevent a user from adding a trailer to the vehicle, or the vehicle simply is not adapted to allow a rear mounted load carrier mount using a hitch mount, tow ball mount or trunk mount.

For some individuals the ideal choice may be a roof mounted load carrier, where the positioning of the bicycle does not prevent the use of a trailer and it does not reduce the visibility of the driver. A roof mounted load carrier is often attached to a roof rack or a load carrying bars on the roof of a vehicle in order to provide optimal stability of the load carrier above the roof of the vehicle.

The choice of an optimal load carrier for a bicycle is highly dependent on personal choice as well as what type of bicycle the load carrier is supposed to hold. Some load carriers are specifically designed to mount the bicycle to its frame, where the wheels of the bicycle do not carry any load during transport. This type of load carrier is often used for rear mounted load carriers. A different type of load carrier may be a roof mounted carrier, where the wheels rest on a wheel tray, while a gripping arm is attached to the frame of the bicycle to hold it in position. However, as sport bicycles, such as racing bicycles, mountain bicycles, and similar high end bicycles are presently made out of composite materials such as carbon fiber, graphite or other types of lightweight materials, the user often wants to prevent any connection between the load carrier and the frame of the bicycle in order to try and prevent any stress damage to the frame that may be caused by the load carrier. Furthermore, modern types of bicycles may have frame constructions that are non-conventional, which means that the frame structure may make it difficult or impossible to use a gripping arm to fix the bicycle to a load carrier, as there may be little room for the gripping arm to grip the frame.

Thus, a common type of load carrier may be a load carrier where the wheels are positioned on a wheel tray, and may be strapped to the load carrier/wheel tray, and where one or both of the wheels are secured to the load carrier using a securing arm.

One such load carrier may be found in U.S. Pat. No. 8,763,870 which shows a bike mount for securing a bicycle to a vehicle rack is provided. The bike mount includes two arms that cooperatively engage a bicycle wheel and retain the wheel securely in place. The bike mount may be configured to include an adjustable tensioning device for securing one of the arms behind the bicycle wheel in a convenient and adjustable manner.

A drawback of the aforementioned load carriers is that the pivotable arms are connected to a single pivot point, which means that when any movement of the bicycle, when it is secured to the load carrier may exert a great force to the pivot point, as the momentum of the bicycle may provide a large amount of torque to the pivot point. The large amount of torque may occur e.g. if the vehicle is in an accident, and the torque may increase the risk that the bicycle may be released during the crash, due to structural failure of the load carrier. The single pivot point may also mean that the force used to fix the bicycle is concentrated in one area of the load carrier, which means that a large amount of load is applied to a concentrated area. The single point also means that the fixation force concentrated in a single point may mean that if a force is applied to the wheel the torque is applied in the same direction for both arms, which also means that the fixation force to the wheel relative to the wheel tray may be seen as insufficient to hold the wheel securely. Furthermore, the fixed size of one or both of the arms may prevent the arms in gripping a wide variety of wheel sizes of bicycles.

One more type of load carrier may be seen as the one shown in U.S. Pat. No. 5,692,659 which shows a rack for securing a wheeled vehicle, for example a bicycle, includes a wheel receiving means that contacts a wheel of the bicycle at least at first and second points. An engaging means for contacting the wheel at a third point is also provided, thereby engaging the bicycle's wheel at least at three points thereof. The engaging means can comprise an extensible arm hingedly mounted to a frame and which is adapted to extend up over the wheel to engage the wheel at an upper point thereof. The extensible arm is retained in a stored position by a retaining means until such time as the arm is extended by a user.

The drawback of the aforementioned rack, may e.g. be seen as a complex and difficult mounting of the load carrier as well as a bicycle to the load carrier, and that the load carrier is not very suited for different types and sizes of bicycles, as the width and the length of the frame is fixed, which means that a wide tire or a wheel having a large diameter may not be securely fastened to the frame.

Thus there is a need for an improved load carrier for a bicycle, where it is easy to mount both the load carrier and the bicycle, with an increased flexibility to the size of the bicycle wheels, as well as an increased security in an accident.

BRIEF SUMMARY OF THE INVENTION

In accordance with the invention, there is provided a vehicle mounted bike carrier comprising: a carrier member having a proximal end and a distal end, where the carrier member is configured to support a bicycle, a supporting structure configured to attach the bike carrier and/or carrier member to a vehicle, a bike supporting device comprising: a first wheel supporting member having a first end having a pivotal connection on the carrier member where the connection is configured to be positioned proximal to the rotational axle of a first bicycle wheel, and a second free end configured to support said bicycle wheel, a second wheel supporting member having a first end having a connection on the carrier member where the connection is configured to be positioned distal to the rotational axle of said first bicycle wheel and a second free end configured to support said bicycle wheel.

Within the scope of the present invention the terms proximal and distal relate to a position relative to the front and the back end of the bike carrier (load carrier), where the term proximal in relation to another entity means that it is closer to the front end that the other entity, while the term distal may mean that it is positioned further away from the front end than the other entity. The front end may also be called the proximal end, while the back end may be called the distal end. The choice may be reversed, and the proximal end may be the back end and the distal end may be the front end. The terms proximal and distal are used in the present application relative to each other, so the term proximal may be seen as the opposite to the term distal, and vice versa.

Within the meaning of the present invention the term carrier member means a structure that is capable of carrying a bicycle. A synonym for the word carrying member may e.g. be a carrying frame, wheel tray, carrying unit, etc.

Within the meaning of the present invention the term rotational axle or rotational axis of a wheel may be seen as the axis where a wheel rotates, such as a wheel hub. When the rotational axis is used as a positioning element relative to another element, the positioning may be seen as its vertical or horizontal positioning. E.g. above the rotational axis means higher in the vertical direction, while in front of the rotational axis means in front of along its horizontal axis.

By providing a first wheel supporting member and a second wheel supporting member that are positioned proximal and distal to the rotational axle of the wheel, respectively, it is possible to provide a load carrier where any force that is applied to the bicycle and/or the vehicle is distributed to at least two different positions on the carrier member. This means that the wheel supporting members are not transferring energy to the same longitudinal position of the carrier member, which reduces a risk of a structural failure of the carrier member and/or the wheel support arms.

Thus, if the vehicle having the bike carrier is in an accident, where the forward momentum of the vehicle is abruptly stopped, i.e. frontal collision, the second arm, which is positioned distal to the rotational axle may absorb the forward momentum of the bicycle via e.g. the front wheel of the bicycle, and as the connection is behind the rotational axle of the wheel the force is absorbed at an angle that is smaller than if the arm would be positioned in front of the rotational axle, which means the force vector is closer to the direction of the momentum than it would be if the connection would be in front of the rotational axle. This reduces the torque applied to the connection, and the torque between the support member and the carrier member, and thereby reduces the risk of a catastrophic failure of the connection, the support member and/or the carrier member.

The same may be stated if the vehicle is in an accident where the momentum of the bicycle is in a rearwards direction, i.e. where the vehicle is abruptly forced in a forward direction, i.e. in a rearwards collision. Thus the positioning of the first wheel supporting member is proximal to the rotational axis of the bicycle wheel. Thus the force may be absorbed by the connection at an angle that is smaller relative to the longitudinal axis of the carrier, than if the positioning of the connection would be distal to the rotational axis. I.e. that the force vector is closer to the direction of the momentum than it would be if the connection would be behind of the rotational axle.

Thus, by positioning connections for the wheel supporting members in proximal and distal to the rotational axle of the wheel, the absorption of the momentum of the bicycle into the carrier member may be performed at a smaller angle, which is less than about 90 degrees, and closer to the direction of the force. Thus, the first and the second support members, used in conjunction to support the wheel of the bicycle, may be better to encounter a predictable abrupt momentum that may occur during a front end or a rear end crash of the vehicle.

Furthermore, the pivotal connection of the first wheel supporting member to the carrier member may allow the user to position the first wheel supporting member in a correct manner after the wheel has been positioned on the carrier member. Thus, the pivotal connection means that the user may adjust the positioning of the second end to fit the size of the wheel, as the second end may intercept the outer periphery of the wheel, i.e. the part of the wheel that is furthest from the rotational axis, in different positions, based on the size of the wheel. I.e. when using a smaller wheel, e.g. a 20" wheel, the first wheel supporting member may be positioned further upwards in a vertical direction, than when using a larger wheel, e.g. a 28" wheel.

When the first wheel supporting member and the second wheel supporting members are in their suitable positions to support the wheel and/or the bicycle in on the carrier member, the first wheel support member and the second wheel support member may be fixedly connected to the wheel. This means that the wheel is fixed in between the wheel support members and/or the carrier member.

In one embodiment the invention may be a vehicle mounted bike carrier comprising: a carrier member having a proximal end and a distal end, where the carrier member is configured to support a bicycle, a supporting structure configured to attach the bike carrier and/or carrier member to a vehicle, a bike supporting device comprising: a first wheel supporting member having and a second wheel supporting member, where the first wheel supporting member is adapted to support a bicycle wheel in a first proximal position which is above the rotational axle of the bicycle wheel, the second wheel supporting member is configured to support the bicycle wheel in a second distal position which is above the rotational axle of the bicycle wheel, and where the first and second wheel supporting members are configured to clamp the bicycle wheel downwards toward the carrier member.

In one embodiment the first wheel supporting member and/or the second wheel supporting member may be configured to be positioned in a storage position where the first and/or the second wheel supporting members are substantially parallel to the carrier member. Thus this means that the wheel supporting members do not extend in a vertical direction above the highest point of the carrier member, the supporting structure or the remaining parts of the bike carrier, so that when the bike carrier is not in use, the bike carrier is kept as close the vehicle in a vertical direction as possible. This reduces the wind resistance of the bike carrier when it is mounted on a vehicle.

In one embodiment the first wheel supporting member and/or the second wheel supporting member may be configured to have a use position where the first and/or the second wheel supporting members extend at an angle from the carrier member. Thus, when the bike carrier is being used to carry bicycles, the wheel supporting members extend away from the carrier member at an angle, where the specific angle may depend on the size of the wheel to which the arms support. The angle may be between 1 degree to less than 90 degrees from horizontal. Thus, when the bike carrier is in use, the first wheel supporting member and the second wheel supporting member are raised from the carrier member, and the second end of both members may extend upwards in a vertical direction away from the carrier member, while the first end is connected to the carrier member.

In one embodiment the first end of the first wheel supporting member may comprise a pivotal connection on the carrier member. By providing the first wheel supporting member with a pivotal connection, the angle of the wheel supporting member, relative to the carrier member may be adjusted from a storage position to a use position, or where the angle of the first wheel supporting member may be adjusted to the size of the wheel to be supported and/or fixed to the carrier member.

In one embodiment the free end of the first wheel supporting member may be configured to support the bicycle wheel on a distal part of the bicycle wheel, and/or the free end of the second wheel supporting member may be configured to support the bicycle wheel on a proximal part of the bicycle wheel. Thus the wheel supporting member may be configured to extend beyond the rotational axle in the longitudinal direction, to support the bicycle wheel on the opposing part of the bicycle wheel. Thus, the wheel support member may be seen as extending from one peripheral area of the wheel to a second peripheral area of the wheel, where the wheel support member extends across a part of the wheel, and intersects a vertical center line, which crosses the rotational axle of the wheel. Thus, the wheel supporting member supports a part of the wheel which is on the opposite side of the rotational axis, seen in a longitudinal direction of the bike carrier. The longitudinal direction may be seen as the direction between the proximal end and the distal end of the carrier member.

In one embodiment the first wheel supporting member and the second wheel supporting member may be configured to be coupled to each other via a coupling member. This connection may fix the angle of each supporting member relative to the carrier member, so that when the two members are coupled to each other they remain at a fixed angle. Furthermore the connection may fix the angle of the support arms relative to each other. By coupling the first wheel supporting member and the second wheel supporting member to each other, it is possible to increase the stability of the wheel support structure, so that the momentum of the bicycle and/or the vehicle may in a forward direction or a rearwards direction may not only be absorbed by a single arm, but a part of the force may be transferred to the other wheel support member. Thus, if the bicycle has a momentum in a forward direction (direction of forward motion of the vehicle) this forward momentum may be absorbed by the second wheel supporting member, and the coupling between the two members ensures that any rotational movement to one of the arms may be prevented or at least reduced significantly by the connection and the force may be transferred to the other member via the coupling.

In one embodiment the coupling member may be configured to be engaged when the first wheel supporting member and the second wheel supporting members are extended at an angle from the carrier member. By configuring the coupling to be engaged when the first and the second wheel supporting members extend in a vertical direction away from the carrier member, the coupling may be engaged when the bicycle wheel is positioned in between the members and the members fix the wheel to the carrier member in a clamping engagement. The coupling may fix the first and the second wheel supporting member in an X-shaped configuration, where the coupling may be in an area that is between the first end and the second end of both the first and the second wheel supporting member. The first ends of the first and second wheel supporting members are fixed to the carrier member, which ensures that the second ends of the wheel supporting members are in mechanical connection with the carrier member in at least two positions that are proximal and distal to the rotational axle, respectively.

Furthermore, the coupling may fix the first and/or the second wheel supporting member in their raised (vertically) position.

In one embodiment the coupling member may be provided with a release mechanism, so that the first wheel supporting member is configured to be selectively released from the second wheel supporting member. Thus, when the release mechanism has been activated, the coupling between the first wheel supporting member and the second wheel supporting member has been disengaged. This means e.g. that one or both of the wheel supporting members may be pivotally maneuvered in a direction towards the carrier member, to move the member from its vertically raised position to a collapsed position, where the member is substantially parallel to the longitudinal axis of the carrier member.

In one embodiment the bike supporting device may be configured to support the front wheel of a bicycle. By supporting the front wheel of the bicycle it is meant that the first and the second wheel supporting member are supporting the front wheel of the bicycle. The front wheel of a bicycle is often attached only via the bicycle fork, which means that it may be easy to access peripheral areas of the wheel in a simplistic manner, and the second end of the first and second wheel supporting members may be extended upwards in a vertical direction along the periphery of the wheel to a greater height than compared to the back wheel of the bicycle.

In one embodiment the length of the first and/or the second wheel supporting from the first end to the second end may be configured to be adjustable, optionally via a telescopic arrangement, which is optionally a first telescopic member and a second telescopic member. By providing the first and/or the second wheel supporting member in a telescopic manner, it is possible to adjust the length of the members to a wide range of sizes of wheels. For a smaller wheel the length of the member from its first end to its second end may be reduced, while for a larger wheel the length of the member from its first end to its second end may be increased. Thus, this telescopic arrangement may increase the versatility of the carrier member for many sizes of bicycle wheels, where the length of the members may be adjusted for the specific size.

In one embodiment the first wheel supporting member may comprise a first arm that is pivotally connected to the carrier member and a wheel engaging member that is adapted to support the outer periphery of the wheel. Thus, the first wheel supporting member is capable of engaging an outer periphery of the wheel to be supported, where the wheel engaging member may be used to fix the wheel relative to the first wheel supporting member and/or the carrier member.

The first wheel supporting member may be structured to offset laterally to the longitudinal/central axis of the carrier member, so that the arm may be substantially in parallel to the wheel to be supported. The wheel engaging member, which may be positioned at the second end of the wheel supporting member and/or the arm may be configured to engage the wheel in an area that is vertically above the longitudinal/central axis of the carrier member. If the arm is offset to the lateral side, the wheel engaging member may extend from a lateral position and towards the central axis of the carrier member. In other words, if a vertical plane extends from the longitudinal axis/central axis of the carrier member, the wheel engaging member extends laterally inwards towards the vertical plane of the carrier member.

The wheel engaging member may have a first end that is attached to the second end of the arm, extend laterally towards the vertical longitudinal plane of the carrier member, and extend laterally in the opposite direction, where the wheel engaging member has a free end. Thus, the wheel supporting member may be located only on one lateral side of the vertical plane of the carrier member, i.e. that the first wheel support member has only one arm, which is only on one lateral side of the carrier member. This allows the user to extend the first wheel supporting member in a vertically extending position, where the wheel can be positioned in a lateral direction towards the carrier member, on the opposite side of the arm, allowing the wheel to be supported by the first wheel supporting member.

In one embodiment the second wheel supporting member may comprise a first arm and a second arm that are pivotally connected to the carrier member and a wheel engaging member that is adapted to support the outer periphery of the wheel. Thus the second wheel supporting member may comprise a wheel engaging member, where the wheel engaging member is connected to the second end of a first and a second arm, where the second end is opposite to the first end which may be pivotally connected to the carrier member. Thus, the second wheel support member may have two arms that are provided on opposite lateral sides of the carrier member, and the wheel support member extends from the second end of first arm and towards the second end of the second arm, where the wheel engaging member intersects a vertical plane that is parallel to the longitudinal/central axis of the carrier member.

In one embodiment the second wheel supporting member may be configured to provide an adjustable force to the outer periphery of the wheel, so that the wheel is pushed into the first wheel support member to clamp and/or pinch the outer periphery of the wheel between the first wheel support member, the second wheel support member and the carrier member. Thus, when the second wheel support member is positioned to engage/support the wheel, a force may be applied to the outer periphery of the wheel in order to fix the wheel relative to the carrier member and/or the first wheel support member. The force may be applied via a ratchet mechanism, where the wheel support member may be brought into contact with the wheel, and where the ratchet mechanism prevents the second wheel support member from releasing the force, and thereby clamp the wheel in its position relative to the bike carrier. The ratchet mechanism may be selectively disengaged to release the force, and thereby release the wheel from the second wheel support member.

In one embodiment the carrier member may comprise a wheel receiving member, where the wheel receiving member is optionally moveable along the length of the carrier member from a proximal position to a distal position and vice versa. The wheel receiving member may be adapted to provide support for a lower side of the wheel on the carrier member. The wheel receiving member may be provided with a receiving surface that may extend outwards in a lateral direction, to provide a wider support for the wheel than the carrier member. The support may have a curved receiving surface, so where the bottom of the curve is near its center, and the ends of the curve extend upwards, for receiving the wheel. The curve may be a concave curve, where the bottom of the curve may receive the central peripheral surface of the wheel, i.e. the contact surface to the ground of the wheel.

In one embodiment the first and the second wheel supporting members are configured to force a lower part of the bicycle wheel into the carrier member in a downwards direction. This means that the first and the second wheel supporting members may pull the wheel towards the carrier member and clamp the wheel in three areas, where one area is engaged to the second end of the first wheel supporting member, one area is engaged to the second end of the second wheel supporting member and a third area is engaged to the carrier member. The three areas may be seen as a triangular shape on the wheel, where the triangle points in a substantially downwards direction.

In accordance with one embodiment, the second free ends of the first wheel supporting members and/or the second wheel supporting members may be above the rotational axle of the wheel, in order to be capable of providing a downwards directed force to the wheel so that a lower part of the wheel is forced towards the wheel tray. Within the context of the present invention, the term above the rotational axle, means that a point that is higher in a vertical direction than the rotational axle of the wheel.

In one embodiment a vehicle mounted bike carrier may comprise: a carrier member having a proximal end and a distal end and where the carrier member is configured to support a bicycle, a supporting structure configured to attach the bike carrier and/or carrier member to a vehicle, a bike supporting device comprising: a first wheel supporting member having a first end having a pivotal connection on the carrier member where the pivotal connection is configured to be positioned distal to the proximal end of the carrier frame and proximal to approximately 25% of the length of the carrier member from the proximal end, and a second free end configured to support said bicycle wheel, and second wheel supporting member having a first end having a connection on the carrier member where the connection is configured to be positioned distal to the first connection and proximal to approximately 50% of the length of the carrier member, optionally proximal to 33% of the length of the carrier member, and a second free end configured to support said bicycle wheel.

In one embodiment the first connection may be positioned proximal to 10% of the length of the carrier member from the proximal end and/or where the second connection may be positioned proximal to 33% of the length of the carrier member from the proximal.

Thus, the first and the second connections may be positioned in two different positions along the length of the carrier member, where both connection are in the proximal half of the length of the carrier member or optionally in the proximal third (a third of the length), where the connection may be distanced from each other along the length of the carrier member of at least 2% of the length of the carrier member, or alternatively up to 5% of the length of the carrier member, or alternatively up to 10% of the length of the carrier member.

In one embodiment the bike carrier may comprise a carrier member having a proximal end and a distal end, where the carrier member is configured to support a bicycle, where a proximal part of the carrier member has a downwards sloping part to receive a wheel of a bicycle and configured to allow gravity to act upon the wheel to force the wheel to roll in a proximal direction, the bike carrier further comprising a bike supporting device comprising, a first wheel supporting member having a first end connected to the carrier member and a second free end configured to support a distal part of said bicycle wheel, a second wheel supporting member having a first end having a connection on the carrier a second free end which is configured to be positioned proximal to the sloping part of the carrier member to support said bicycle wheel, so that the wheel is forced into the second end by the slope and/or gravity forces acting upon the wheel and/or the bicycle.

In one embodiment, the second end of the first wheel support member may be configured to apply a force to a distal part of the wheel to force the wheel further against the second end of the second wheel support member.

The downwards sloping part of the carrier member may be seen as an area, where the carrier member is angled downwards from a horizontal axis, at an angle that is configured to impact the wheel in rolling in a downwards and forward direction, i.e. to roll down a decline. The angle of the angle may be between 2 and 45 degrees, or more specifically between 5 degrees and 20 degrees relative to a horizontal axis. The decline (downward slope) may be seen as having a peak (top section) that is distal to the proximal end of the carrier frame, and where the carrier member is angled downwards to an area that is closed to the proximal end of the carrier member. This decline or downwards angled slope will allow the wheel to roll naturally towards the proximal end of the carrier member. When the carrier member has a downwards sloping surface, the second wheel support member may arranged to be fixed in its extended position, so that when the wheel rolls forward, the second wheel support member may grip the wheel and support it in a vertical position, prior to the fixation of the wheel using the first wheel support member.

DETAILED DESCRIPTION OF THE INVENTION

Figure 1:
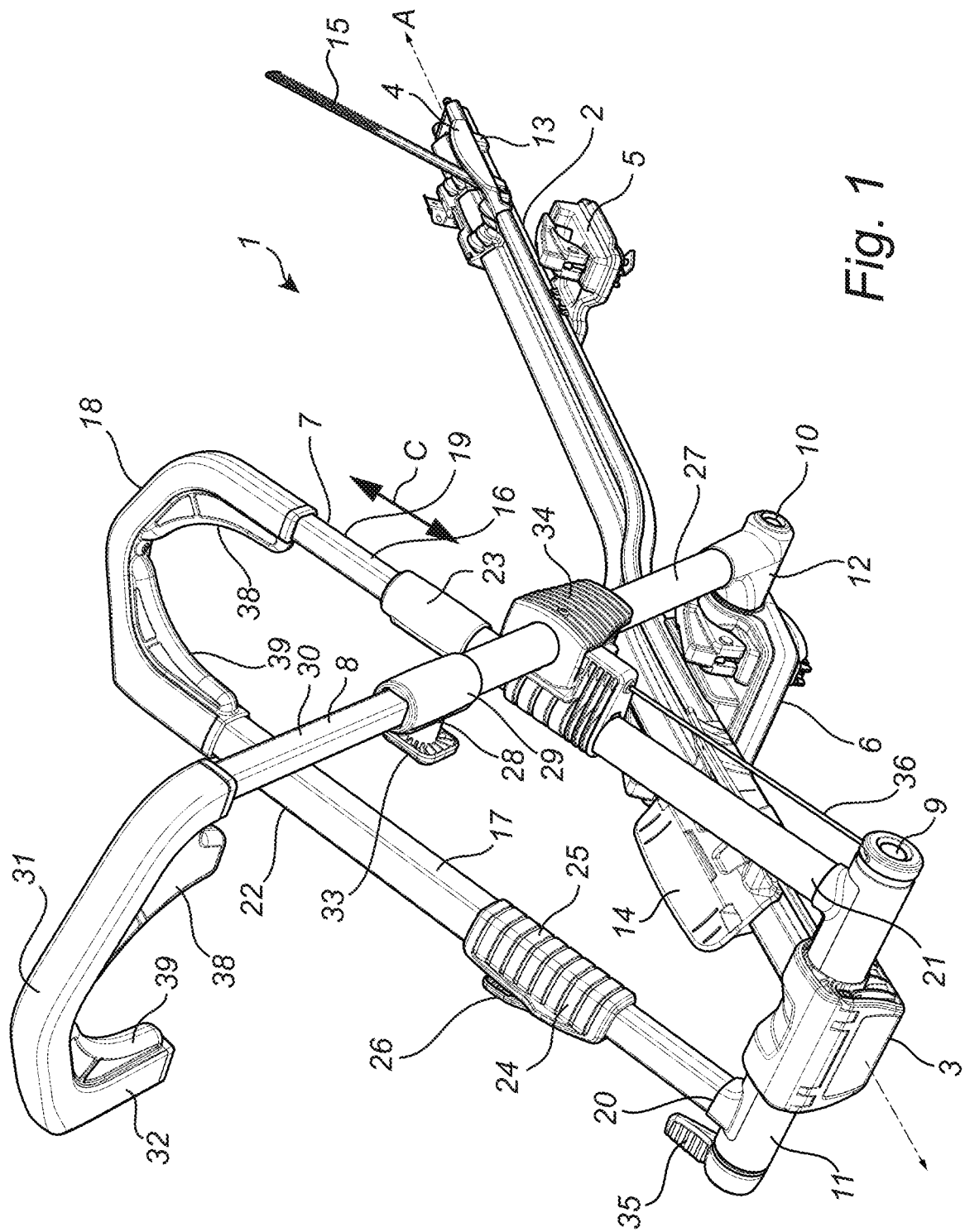
FIG. 1 shows a perspective view of a bike carrier in a use position accordance with the invention.

FIG. 1 shows a perspective view of a bike carrier 1 which may be attached to a vehicle, where the bike carrier comprises a wheel tray 2 (carrier member), having a proximal end 3 and a distal end 4. The wheel tray 2 may be attached to a vehicle using a first attachment member 5 and a second attachment member 6, where in this embodiment, these attachment members 5,6 are configured to be attached to a load carrying bar (not shown) that is mounted on the roof of a vehicle (not shown). In other embodiments the attachment members 5, 6 may be designed differently, depending on where the wheel tray is to be attached to the vehicle and/or how the wheel tray is to be attached to a vehicle, and/or where the wheel tray is to be mounted on a rear mount of a vehicle.

The wheel tray may comprise a first wheel supporting member 7 and a second wheel supporting member 8, which are attached to the wheel tray 2 via a first connection 9 and a second connection 10, respectively. The first wheel supporting member 7 may be connected to the wheel tray via a pivotal connection 11, which allows the first wheel supporting member to pivot relative to the wheel tray 2. In this embodiment the second wheel supporting member 8 is also pivotally connected to the wheel tray 2 via a pivotal connection 12, allowing the second wheel supporting member 8 to pivot relative to the wheel tray 2. However, in other embodiments, the second wheel supporting member 8 may be fixedly connected to the wheel tray 2, where the connection 10 may be fixed so that the second wheel support member remains in its position, as may e.g. be shown in FIG. 2.

The wheel tray 2 may be provided with a first wheel rest 13 and a second wheel rest 14, which may be provided for a front wheel and a back wheel of a bicycle (not shown) The first 13 and the second wheel rests 14 may be slidably arranged on the wheel tray 2, so that dependent on the size of the wheel and the size of the bicycle the wheel rests may be slid along the longitudinal axis A of the wheel tray. The wheel rests 13, 14 may be provided with a strap 15, adapted to fix the wheel relative to the wheel rest 13, 14 and/or relative to the wheel tray 2 during use. In this embodiment only the second wheel rest 14 comprises a strap 15.

Figure 5:
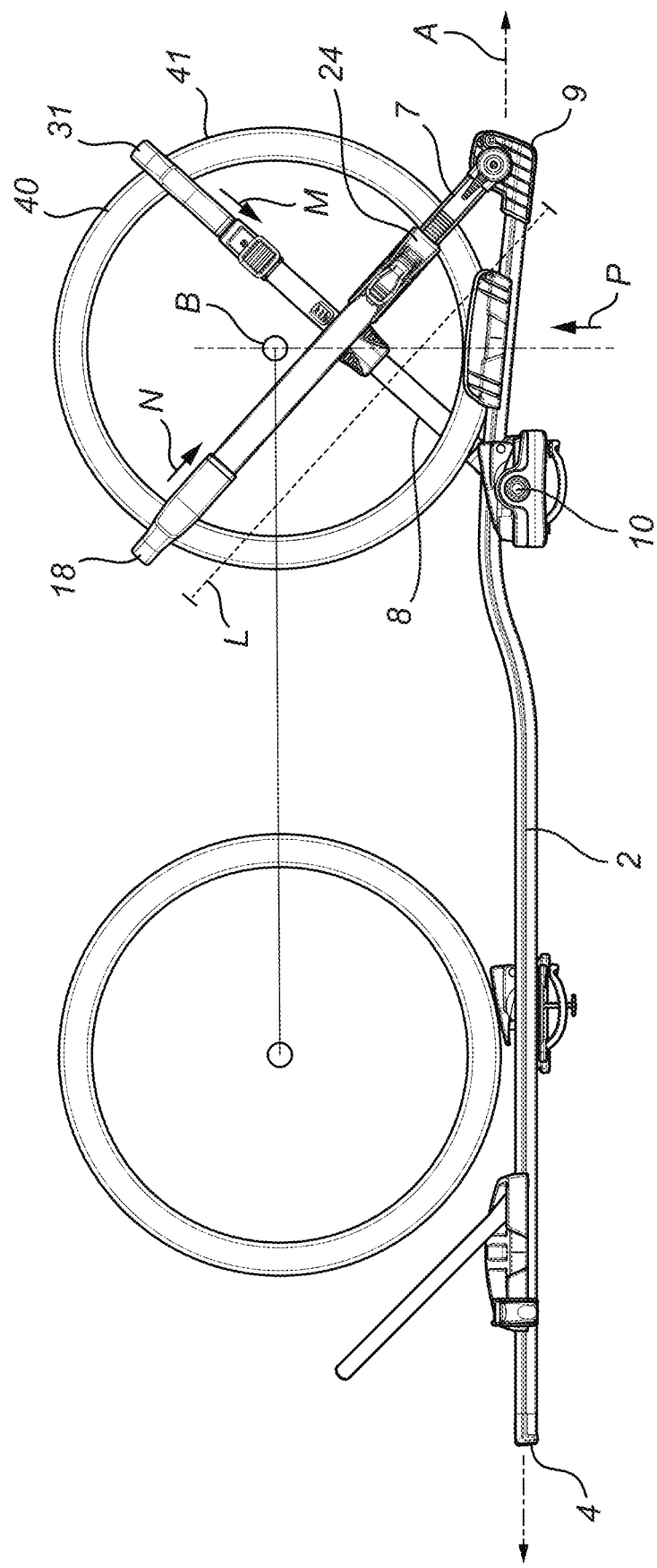
FIG. 5 shows a side view of a bike carrier in a use position supporting a small diameter wheel.
Figure 6:
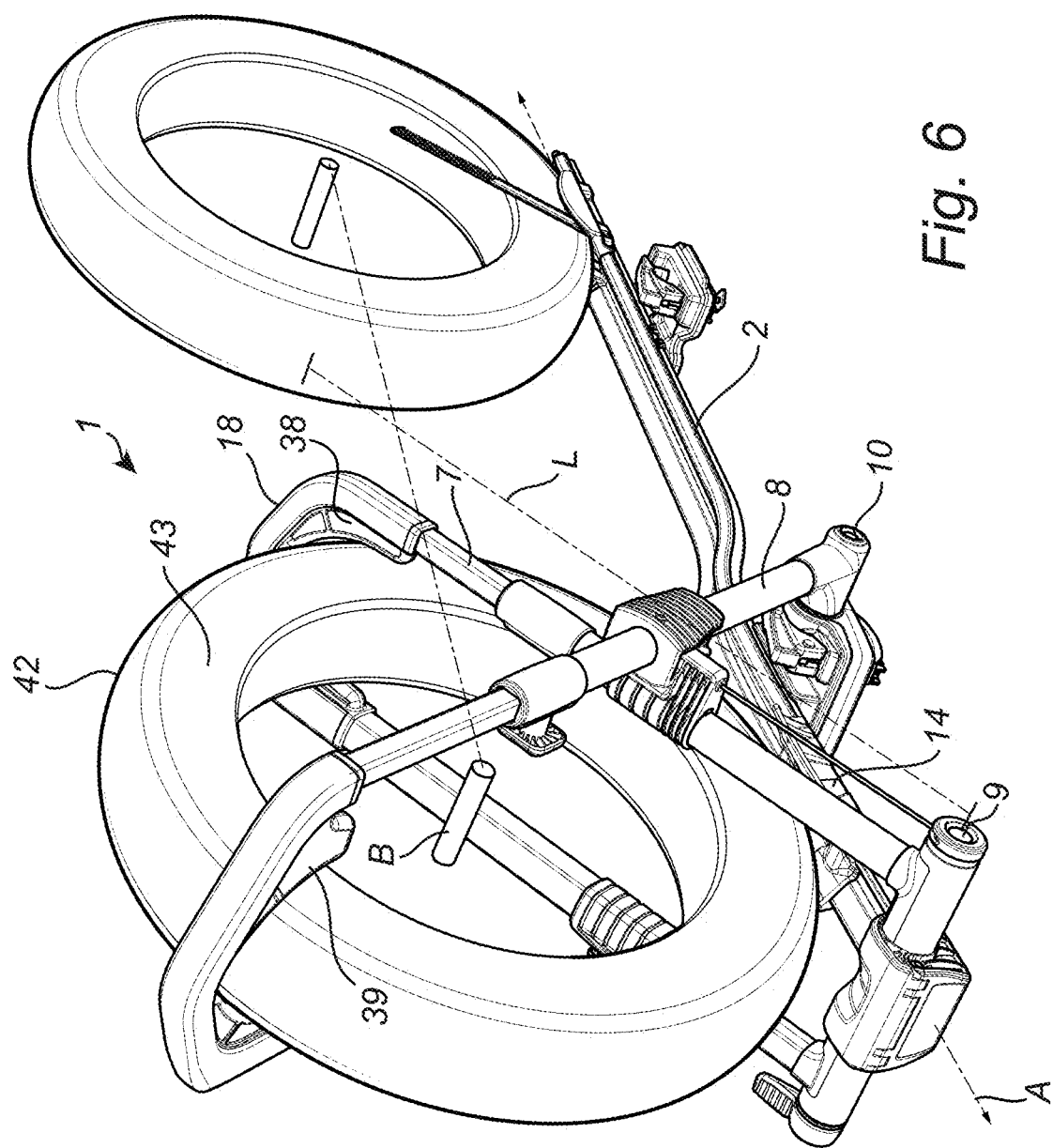
FIG. 6 shows a perspective view of a bike carrier in a use position supporting a wheel having wide tires.
Figure 7:
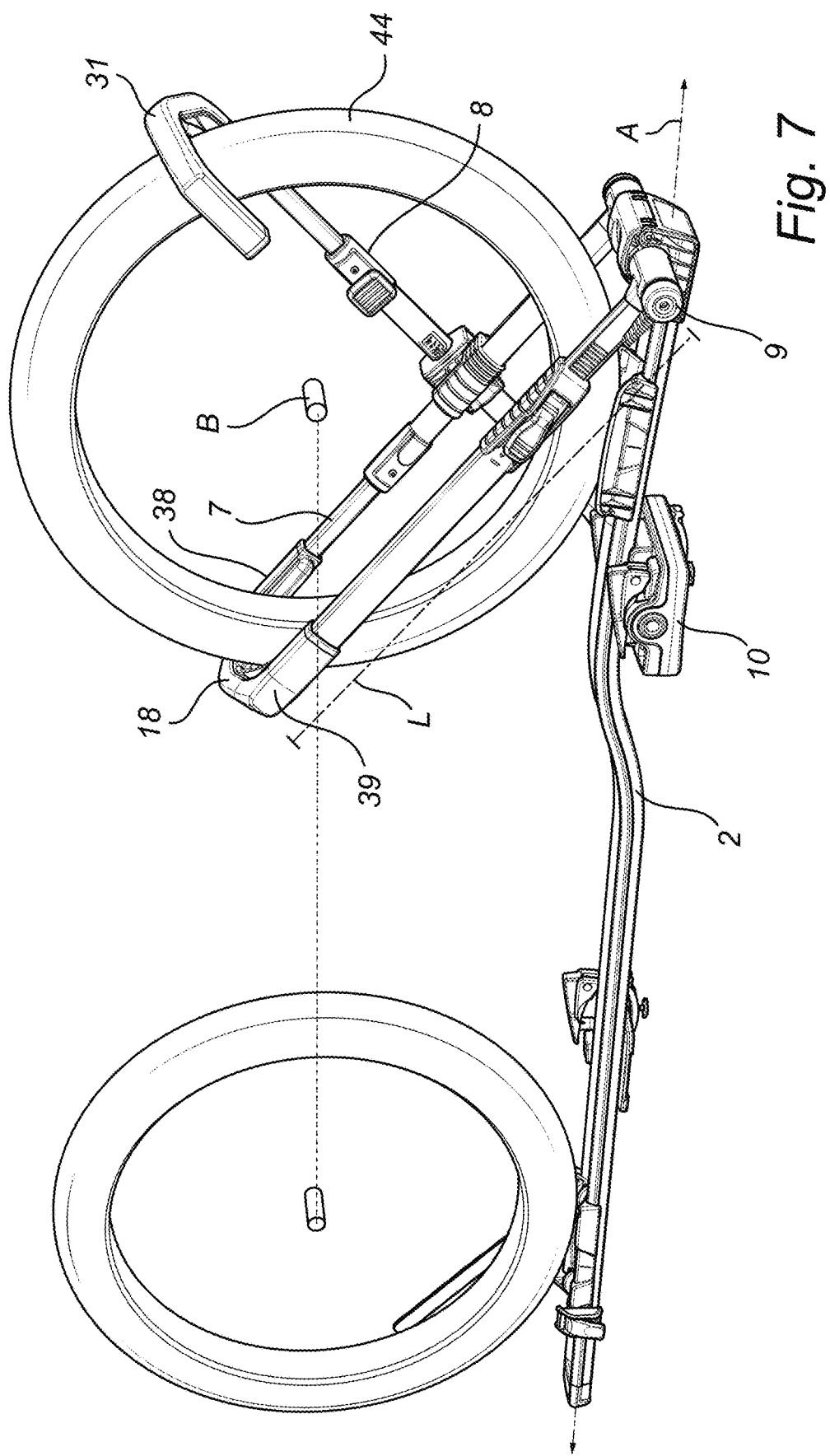
FIG. 7 shows a perspective view of a bike carrier in a use position supporting a large diameter wheel.

The proximal part of the bike carrier 1 is adapted to receive and support a wheel of a bicycle, in order to fix the wheel relative to the carrier member 2, where the wheel is adapted to be positioned in between the first wheel support member 7 and the second wheel support member 8, so that the rotational axis B of the wheel 40, 42, 44, is configured to be positioned between the first connection 9 and the second connection 10 in the longitudinal direction, as shown e.g. in FIGS. 5, 6 and 7. In order to achieve this, the first connection 9 is positioned at a first position along the longitudinal axis of the wheel tray 2 while the second connection 10 is positioned distal to the first connection 9 in the longitudinal direction of the wheel tray 2, along the longitudinal axis A of the wheel tray. By positioning the two connection 9, 10 at a distance from each other along the longitudinal axis A, the wheel support members 7, 8 can extend diagonally upwards in a forward facing direction (towards the proximal end) for the second wheel support 8 and a backwards facing direction (towards the distal end) for the first wheel support 7, in order to grip and support the wheel in between the two members 7, 8.

The first wheel support member may comprise a first lateral arm 16 and a second lateral arm 17, that are attached at their first end to the connection 9, and that terminate in a wheel engaging member 18 at the opposite end. The arms 16, 17 may be telescopically arranged 23, 24, so that the distance from the connection 9 (or the wheel tray) to the wheel engaging member 18 may be adjusted in the direction of arrow C, to accommodate for the size of the wheel to be supported. When the wheel is small, the distance may be reduced, while for a larger wheel the distance may be increased. The telescopic arms 16, 17 may comprise inner arms 19, 20 that has a first outer diameter, and outer arms 21, 22 having an first inner diameter that is equal to or larger than the first outer diameter, where the inner arm 19, 20 is positioned inside the outer arm 21, 22, on either side. One of the arms 16, 17. may be provided with a ratchet mechanism 25 that allows the wheel engaging member 18 to be selectively pulled towards the connection 9, with a force, in order to apply a force to a wheel that is positioned between the two points. The ratchet mechanism may be operated via a lever 26 that is pivoted from the telescopic connection to pull the wheel engaging part 18 towards the connection, and where the ratchet mechanism prevents the wheel engaging part 18 to move beyond the positioning, until the ratchet mechanism 25 is released.

The second wheel supporting member 8, may be connected to the wheel tray 2 via connection 10, where the second wheel supporting member only has one arm, 27, that is positioned laterally from the wheel tray 2, and where the arm 27 terminates in a wheel engaging member 31, that is capable of engaging the outer surface, or the outer perimeter of the wheel to be supported. The wheel engaging member 31 extends from one lateral side of the longitudinal axis A and intersects the longitudinal axis to terminate in a free end 32, which is on the opposite side of the longitudinal axis, as seen from above. The arm 27 may be telescopically arranged 28, where the telescopic arrangement comprises an outer arm 29 and an inner arm 30, where the inner arm 30 inters the inner volume of the outer arm 29. The length of the telescopic arm 27 may be adjusted prior to the mounting of the wheel, so that the distance of the wheel engaging member 31 and the connection 10 may be adjusted to the specific wheel diameter. E.g. for a large wheel the length of the arm 27 is pre-set to a predefined length that fits the diameter of the wheel, and for a small wheel the length of the arm 27 is pre-set to a predefined length that is shorter than for the larger wheel, and fits the diameter of the smaller wheel. The locking mechanism for the arm 27, may be arranged by the telescopic arrangement 28, and can be used to pre-set the length of the arm, by using a pin 33 that engages a suitable opening in the inner arm 30.

The first 7 and the second 8 wheel support members, may be coupled to each other via a coupling 34, which is capable of fixing the first member 7 to the second member 8, and thereby create a triangular shape, between the first connection 9, second connection 10 and the coupling 34 to increase the sturdiness of the arms, when they engage via the coupling 34. The triangular shape, which may be seen as a triangle that points upwards, as the base line of the triangle extends between the first connection 9 and the second connection 10, and is substantially parallel to the carrier member 2, while the right arm of the triangle extends between the first point 9 and the coupling 34, and the left arm of the triangle extends between the second point and the coupling 34. This creates a sturdier structure, where any rotational forces may be transferred from one member to the other, via the coupling, and may be absorbed by the coupling, as the triangular fixed shape prevents the members from being pivoted.

Thus, if a force is applied to the first 7 or the second member 8, in a forward facing direction or a backwards facing direction, the force is distributed between both connections 9, 10, and reduce the risk that the arms would pivot due to a torque applied to either connection 9, 10, as the coupling fixes the pivotal position (angle) of each arm 7, 8. The coupling may be provided with a release lever 35, which is mechanically coupled to the coupling 34 via a wire 36, that allows the coupling to be selectively released and thereby disengaging the connection between the first member 7 and the second member 8. When the release lever is in its locked position, the release mechanism inside the coupling 34 will click into place, and automatically engage the connection between the first arm 7 and the second arm 8. This causes the arms to be connected to each other so that they cross each other (as seen from the side) creating an X-shape, as may be seen in FIG. 5.

Figure 2:
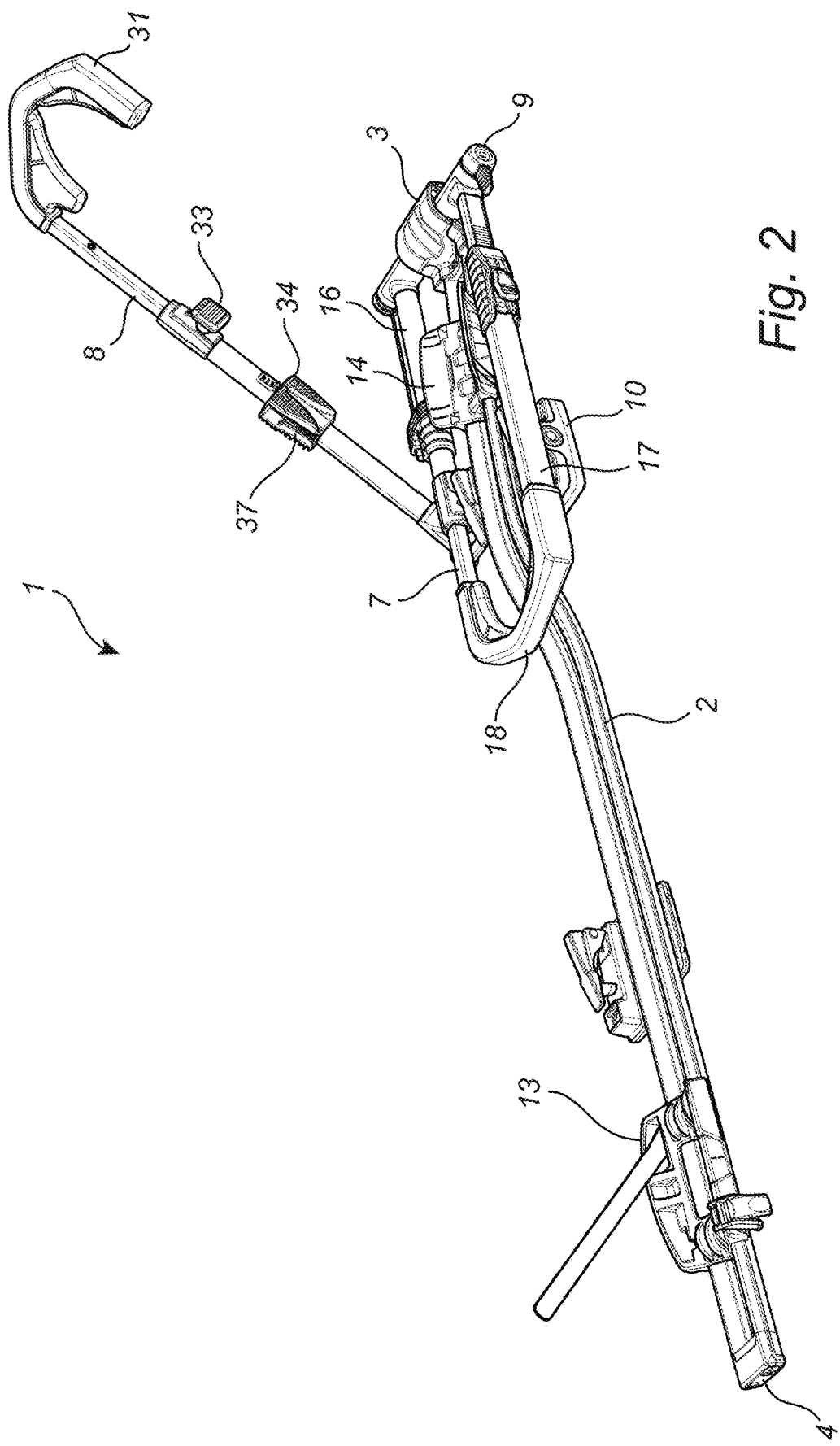
FIG. 2 shows a side perspective view of the bike carrier of FIG. 1 in an intermediate position.

Each of the wheel engaging members 18, 31 may be provided with concave ribs 38, 39, that are configured to be positioned on each side of the wheel, where the concave ribs 38, 39 allow a lateral support of the wheel when the wheel engaging members 18, 31 engage the wheel, and ensure that the bicycle and/or the wheel cannot tilt to the side when fixed to the arms. FIG. 2 shows the carrier 1 of FIG. 1, where the first arm 7 has been collapsed from its use position to its storage position, by pivoting the arm 7 in a backwards direction via the first connection 9 so that the second end of the arm 7, or the wheel engaging part 18 is pivoted down towards the wheel tray 2. This positioning of the first arm 7 and the second arm 8 may be seen as the bike mounting position, where the bike carrier is capable of receiving a bicycle, and the second arm can support the wheel in its vertical/upright position during the mounting process. This positioning of the carrier 1 and the first arm 7, where the arm 7 is substantially parallel to the longitudinal axis of the wheel tray 2, is advantageous for a user to position a bicycle (not shown) onto the wheel tray 2 or the wheel rests 13, 14. The second arm 8 has previously been adjusted in length to receive the wheel of a specific diameter, so that the wheel may be inserted into the wheel engaging portion 31, to support the bicycle (not shown) in its vertical position. When the wheel has been positioned on the wheel tray 2 or the wheel rest 14, the first arm may be pivoted upwards, into the position shown in FIG. 1, so that the first 16 and the second 17 arms of the first wheel support member 7 extend laterally on the sides of the wheel, and the coupling 34 may be engaged, by sliding a pin (not shown) into a coupling slot 37 in the coupling member 34. Subsequently the length of the first arm 7 may be adjusted so that the wheel is clamped between the wheel engaging member 18 and the wheel tray or the wheel rest 14. The force applied by the first arm 7 forces the wheel forwards towards the proximal end 3, and ensures that the wheel is forced into the engaging member 31 of the second wheel support member 8, and thereby clamping the wheel between the first engaging member 18, the second engaging member 31 and the wheel tray 2 or wheel rest 14, which fixes the bicycle to the carrier rack. This engagement may be seen in FIGS. 5, 6 and 7, for different sizes of wheels.

Figure 3:
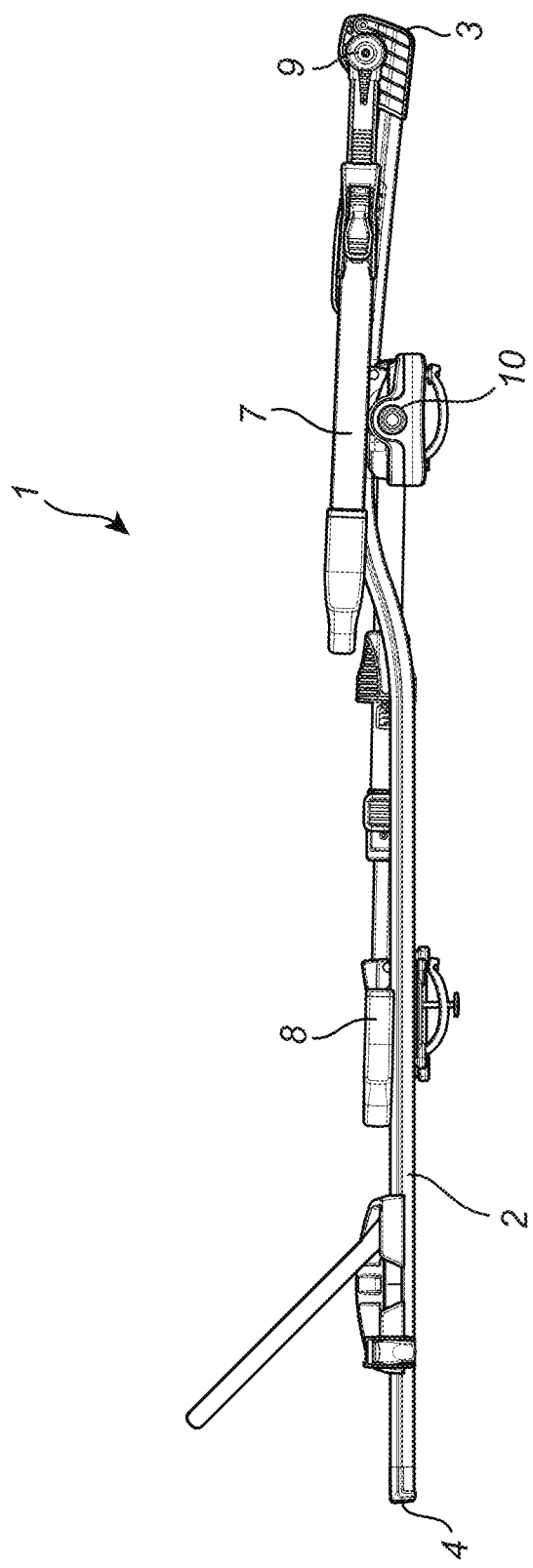
FIG. 3 shows a side view of a bike carrier in its storage position.
Figure 4:
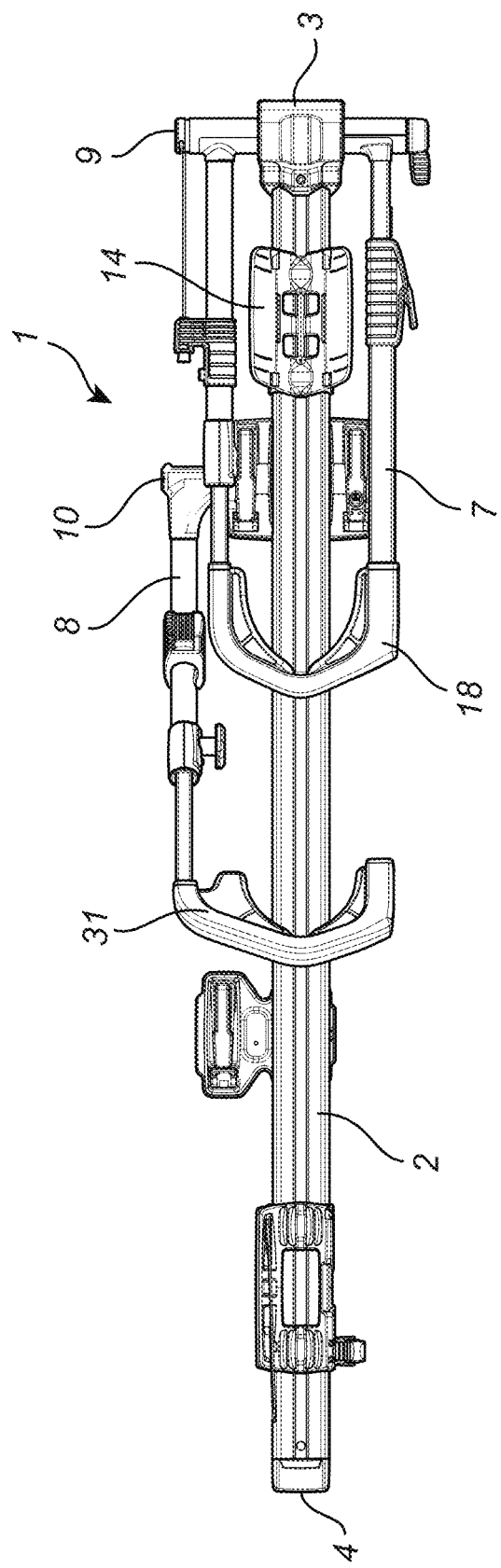
FIG. 4 shows a top view of a bike carrier in its storage position.

FIG. 3 shows an embodiment of the bike carrier 1 where the second arm 8, has been pivoted backwards in the direction towards the distal end 4, in order to position the second arm 8 in a storage position. The arm 8 is pivoted via the second connection 10 so that the wheel engaging part 31 abuts the wheel tray, and the arm 8 is substantially parallel to the longitudinal axis of the wheel tray 2. In this position both arms are positioned so that the bike carrier 1 may be stored either away from the vehicle, or on the vehicle, without taking too much space. FIG. 4 shows the same configuration from the top, or top perspective view.

In one embodiment the first connection 9 may be positioned at a higher position in a vertical direction that the second connection 10.

When a bicycle is to be mounted on the bicycle carrier, as shown in FIG. 1-4, the carrier may initially be in a storage position, where both arms are positioned as shown in FIGS. 3 and 4, or alternatively in an alternative storage position as shown in FIG. 2, where the second arm is extended in a direction from the carrier frame 2 in a fixed manner. If the bike carrier is positioned in its storage position, as shown in FIG. 3, the second arm may be pivoted from its collapsed position, to its extended position as shown in FIG. 2. Depending on the size of the wheels of the bicycle, the user may telescopically adjust the length of the second arm and lock it in its suitable position where the arm has a length that fits the size of the wheel. Then the user mounts the bicycle on the carrier, placing one wheel (often the front wheel) close to the proximal end and the second wheel at the distal end, and where the wheel is positioned inside the wheel engaging part 31, where the wheel engaging part, which extends to both sides of the wheel ensures that the wheel cannot tilt and fall off the carrier. If the carrier member is tilted downwards in its proximal part, the bicycle will roll in a proximal direction, and hold it in position where the wheel engaging part grips the wheel. Subsequently the user pivots the first member 7 upwards, into a position shown in FIG. 1, so that the coupling 34 clicks into place, and locks the first member 7 to the second member 8. Following that, the user may telescopically shorten the first member 7, using the lever 26 to apply a force to the member 7 to shorten it, until it comes into contact with the distal part of the wheel. Then the user may apply a suitable force to the lever, to force the wheel engaging member 18 into the wheel, causing the wheel to be clamped between the second wheel engaging member 31 and the first wheel engaging member 18, and the wheel tray 2 or the wheel rest 14, and thereby fixing it in position. Subsequently the user may apply the strap 15 to secure the distal wheel of the bicycle to the wheel tray 2.

FIG. 5 shows a bike carrier 1, having a small tire/wheel 40 clamped between the first arm 7 the second arm 8, where the rotational axle B of the wheel 40 is positioned in between the first connection 9 and the second connection 10 along the longitudinal axis A of the wheel tray 2. In this configuration, the length L between the first connection 9 and the wheel engaging part 18 is relatively short, where the telescopic arrangement is short. When the wheel has been introduced onto the carrier 1, a force N is applied to the first arm 7, via the ratchet mechanism, where the force vector is downwards and forwards, as shown with arrow N. This force forces the wheel in a proximal direction, so that the outer periphery 41 is forced into the second wheel engaging member 31, resulting in a force vector M, which is parallel to the second arm 8, and indicated by the arrow M. These two force vectors, N and M result in a third force vector P, which forces the wheel towards the wheel tray 2 or the wheel rest 14. The wheel rest may be slidable along the wheel tray 2, ensuring that when forces are applied to the wheel using the first arm and/or the second arm, that could cause the wheel to move in a longitudinal direction and/or rotate, the wheel rest 14 may slide with the wheel, ensuring that there do not occur shearing forces between the wheel and the wheel tray 2. Furthermore, the wheel rest 14 may assist in obtaining the optimal contact point for the wheel on the wheel tray. The wheel rest 14 may be concave, having sides that extend in a vertical direction, ensuring that the wheel cannot slide in a lateral direction off the wheel rest 14 or the wheel tray 2.

FIG. 6 shows a bike carrier 1, having a wide tire/wheel 42 clamped between the first arm 7 and the second arm 8, where the rotational axle B of the wheel 42 is positioned in between the first connection 9 and the second connection 10 along the longitudinal axis A of the wheel tray 2. Here it may be seen that the wheel 40 has a side wall 43 that is relatively wide, so that the ribs 38, 39 of the wheel engaging part 18, engage the side wall of the wheel. Furthermore, compared to the wheel 40 in FIG. 5, this wheel 42 has a larger diameter, and therefore the length L of the first wheel support member 7 and the second wheel support member 8, is larger than what is shown in FIG. 5. However, the clamping function of the first wheel support member, the second wheel support member and the wheel tray 2 is similar.

FIG. 7 shows a bike carrier 1, having a wide tire/wheel 44 clamped between the first arm 7 and the second arm 8, where the rotational axle B of the wheel 44 is positioned in between the first connection 9 and the second connection 10 along the longitudinal axis A of the wheel tray 2. Here it may be seen that the wheel 42 is has a wheel diameter that is larger than the wheel 40 shown in FIG. 5, but also having a width that is smaller than the wheel 42 shown in FIG. 6. However, the ribs 38, 39 of the wheel engaging part 18, engage the side wall of the wheel 44. Furthermore, compared to the wheel 40 in FIG. 5, this wheel 44 as a larger diameter, and therefore the length L of the first wheel support member 7 and the second wheel support member 8, is larger than what is shown in FIG. 5. However, the clamping function of the first wheel support member, the second wheel support member and the wheel tray 2 is similar.

Figure 8:
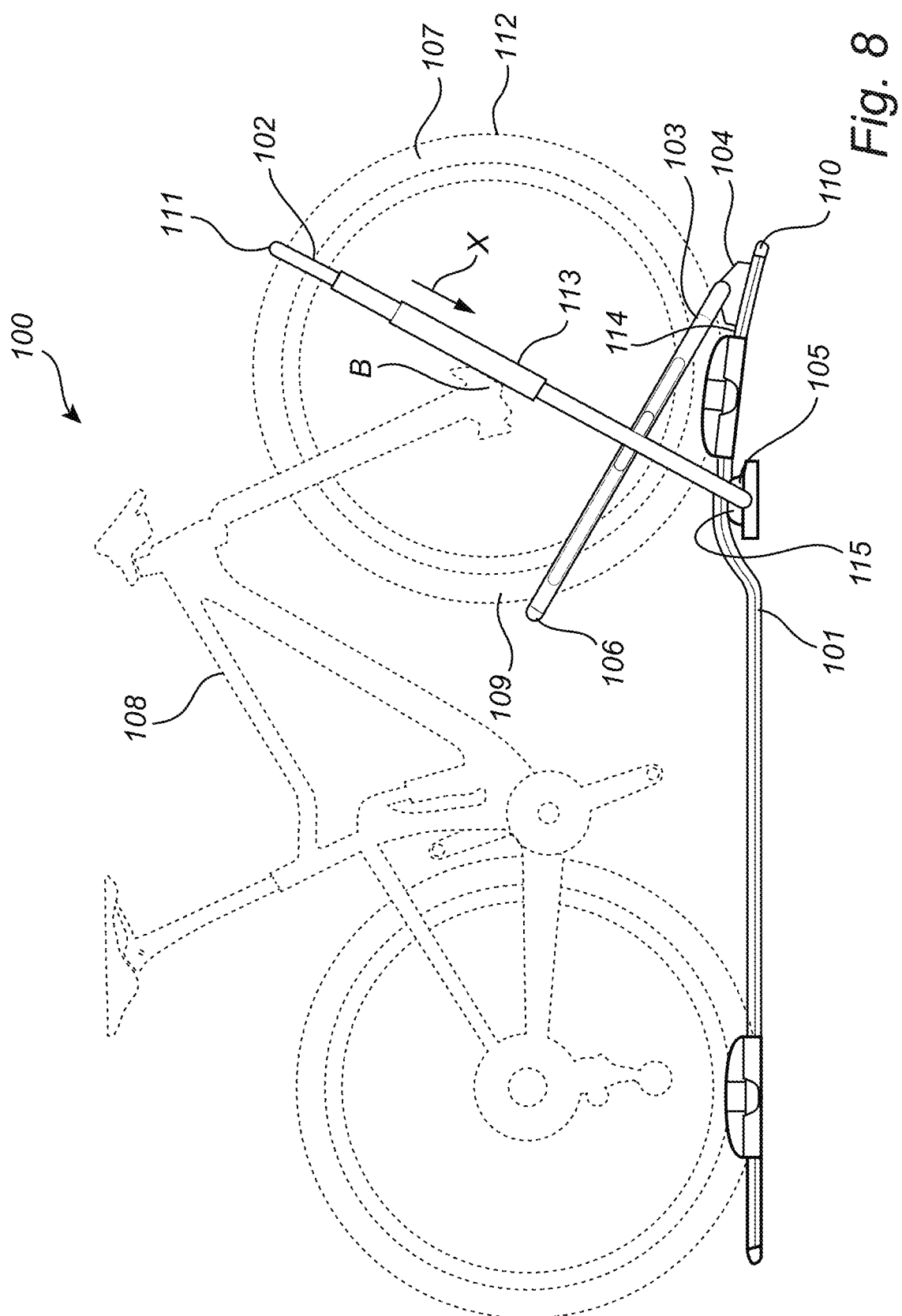
FIG. 8 shows a side view of another embodiment of the bike carrier in a use position.

FIG. 8 shows another embodiment of the bike carrier 100 according to the invention, where the bike carrier comprises a carrier member 101, a first wheel support member 103 which is attached to the carrier member 101 via a first connection 104, and a second wheel support member 102 which is attached to the carrier member 101 via a second connection 105. The free end 106 of the first wheel supporting member 103 may be adapted to grip the wheel 107 of the bicycle 108 on its distal part 109, while being connected to a proximal part 110 of the carrier frame 101. In this embodiment the free end 106 of the first wheel supporting member 103 may engage the wheel in an area that may be vertically below the rotational axis B of the wheel 107. The free end 111 of the second wheel supporting member 102, may engage a proximal part 112 of the wheel 107 in an area of the wheel that is vertically above the rotational axis B of the wheel 107.

In the embodiment shown in FIG. 8 the second wheel supporting member 102 may comprise a ratchet member 113 applied to a telescopical or extendible wheel supporting member 102, where the ratchet member 113 is capable of applying a force in a direction parallel to the wheel supporting member, as shown by arrow X, to force the wheel into contact with the carrier member 101 as well as forcing the distal part of the wheel into engagement with the free end 106 of the first wheel supporting member 103.

In this embodiment both the first wheel supporting member 103 and the second wheel supporting member 102 may be similar to the first arm shown in FIG. 1, having a first and a second arm that are connected at their second ends using a wheel engaging member. Thus both arms may be U shaped, where the curved part is at the second end and the opposed part is attached via a pivotal connection or a fixed connection to the carrier member 101. Both arms to be U shaped can as well apply to the embodiment shown in FIG. 1.

The proximal part of the carrier member may be provided with a sloping surface 114, which slopes downwards from a distal part 115 towards the proximal part 110 of the carrier member, allowing gravity to act upon the wheel 107 and forcing the bicycle to roll forwards in a proximal direction (in a direction from the distal end to the proximal end). This sloping surface may be applied to all the embodiments disclosed, and the remaining parts of the carrier frame could easily be adapted to function with a carrier member 101 having a sloping surface.

The sloping surface 114 ensures that the forward downward rolling applies a certain amount of force to push the wheel into the wheel engaging part 31 of the second member, caused by gravity, and this means that when the wheel is pushed with the first arm in a proximal direction will push the wheel forward and into a tight grip. The total grip will be greater, and it may be envisioned that the user will not need to add as much force into the ratcheting mechanism to obtain an optimal clamping of the wheel.

What is claimed is:

1. A vehicle mounted bike carrier comprising:
   a carrier member having a proximal end and a distal end, wherein the carrier member is configured to support a bicycle;
   a supporting structure configured to attach the carrier member to a vehicle; and
   a bike supporting device comprising:
   a first wheel supporting member having a first end having a pivotal connection on the carrier member wherein the pivotal connection is configured to be positioned proximal to a rotational axle of a first bicycle wheel, and a second free end configured to support the first bicycle wheel,
   wherein the free end of the first wheel supporting member is configured to be positioned distal to the rotational axle of the first bicycle wheel and to support the first bicycle wheel on a distal part of the first bicycle wheel, and
   a second wheel supporting member having a first end having a connection on the carrier member wherein the connection is configured to be positioned distal to the rotational axle of the first bicycle wheel and a second free end configured to support the first bicycle wheel,
   wherein the free end of the second wheel supporting member is configured to be positioned proximal to the rotational axle of the first bicycle wheel and to support the first bicycle wheel on a proximal part of the first bicycle wheel.

2. A vehicle mounted bike carrier according to claim 1, wherein the first wheel supporting member and the second wheel supporting member are configured to be positioned in a storage position wherein the first and the second wheel supporting members are parallel to the carrier member.

3. A vehicle mounted bike carrier according to claim 1, wherein the first end of the second wheel supporting member comprises a pivotal connection on the carrier member.

4. A vehicle mounted bike carrier according to claim 1, wherein the first wheel supporting member and the second wheel supporting member are configured to have a use position wherein the first and the second wheel supporting members extend at an angle from the carrier member and wherein the free end of the second wheel supporting member is configured to be positioned proximal to the free end of the first wheel supporting member.

5. A vehicle mounted bike carrier according to claim 1, wherein the first wheel supporting member and the second wheel supporting member are configured to be coupled to each other via a coupling member.

6. A vehicle mounted bike carrier according to claim 5, wherein the coupling member is configured to be engaged when the first wheel supporting member and the second wheel supporting members extend at an angle from the carrier member.

7. A vehicle mounted bike carrier according to claim 5, wherein the coupling member is provided with a release mechanism, wherein the first wheel supporting member is configured to be selectively released from the second wheel supporting member.

8. A vehicle mounted bike carrier according to claim 1, wherein the bike supporting device is configured to support a front wheel of a bicycle.

9. A vehicle mounted bike carrier according to claim 1, wherein a length of the first and the second wheel supporting members from the first end to the second end is configured to be adjustable.

10. A vehicle mounted bike carrier according to claim 1, wherein the first wheel supporting member comprises a first arm that is pivotally connected to the carrier member and a wheel engaging member that is adapted to support an outer periphery of the first bicycle wheel.

11. A vehicle mounted bike carrier according to claim 1, wherein the second wheel supporting member comprises a first arm and a second arm that are pivotally connected to the carrier member and wheel engaging member that is adapted to support an outer periphery of the first bicycle wheel.

12. A vehicle mounted bike carrier according to claim 1, wherein the second wheel supporting member is configured to provide an adjustable force to an outer periphery of the first bicycle wheel, wherein the first bicycle wheel is pushed into the first wheel support member to secure the outer periphery of the first bicycle wheel between the first wheel support member, the second wheel support member and the carrier member.

13. A vehicle mounted bike carrier according to claim 1, wherein the carrier member comprises a wheel receiving member, wherein the wheel receiving member is moveable along a length of the carrier member from a proximal position to a distal position and from the distal position to the proximal position.

14. A vehicle mounted bike carrier according to claim 1, wherein the second free ends of the first wheel supporting member and the second wheel supporting member are above the rotational axle of the first bicycle wheel and configured to provide a downward directed force to the first bicycle wheel, wherein a lower part of the first bicycle wheel is forced towards the carrier member.

15. A vehicle mounted bike carrier comprising:
    a carrier member having a proximal end and a distal end, wherein the carrier member is configured to support a bicycle, and wherein a proximal portion of the carrier member has a sloping surface that slopes downward in a direction from the distal end toward the proximal end; and
    a bike supporting device comprising:
    a wheel supporting member having a first end coupled to the carrier member at a position configured to be distal to a rotational axle of a bicycle wheel and a second free end configured to support the bicycle wheel disposed on the sloping surface, wherein the first end of the wheel supporting member is disposed distal to the rotational axle of the bicycle wheel and the second end of the wheel supporting member engages the bicycle wheel proximal to the rotational axle of the bicycle wheel, and a second wheel supporting member having a first end and a second end, wherein the first end of the second wheel supporting member is coupled to the carrier member and disposed proximal to the rotational axle of the bicycle wheel, and wherein the second end of the second wheel supporting member engages the bicycle wheel distal to the rotational axle of the bicycle wheel.

16. A vehicle mounted bike carrier according to claim 15, wherein the second free end is configured to engage a proximal portion of the bicycle wheel in an area vertically above the rotational axle of the bicycle wheel.

17. A vehicle mounted bike carrier according to claim 15, wherein the first end of the wheel supporting member comprises a pivotal connection with the carrier member.

18. A vehicle mounted bike carrier according to claim 15, wherein the pivotal connection is disposed below the sloping surface of the carrier member.

19. A vehicle mounted bike carrier according to claim 15, wherein the wheel supporting member further comprises a ratchet member configured to apply a force in a direction parallel to the wheel supporting member.

20. A vehicle mounted bike carrier according to claim 15, wherein the proximal end of the carrier member is disposed vertically below the distal end of the carrier member.

21. A vehicle mounted bike carrier comprising:
a carrier member having a proximal end and a distal end, wherein the carrier member is configured to support a bicycle;
a supporting structure configured to attach the carrier member to a vehicle; and
a bike supporting device comprising:
a first wheel supporting member having a first end having a pivotal connection on the carrier member wherein the pivotal connection is configured to be positioned proximal to a rotational axle of a first bicycle wheel, and a second free end configured to support the first bicycle wheel on a distal part positioned distal to the rotational axle of the first bicycle wheel, and
a second wheel supporting member having a first end having a connection on the carrier member wherein the connection is configured to be positioned distal to the rotational axle of the first bicycle wheel and a second free end configured to support the first bicycle wheel on a proximal part positioned proximal to the rotation axle of the first bicycle wheel, and
wherein the first wheel supporting member and the second wheel supporting member are configured to be coupled to each other via a coupling member.

22. A vehicle mounted bike carrier according to claim 21, further comprising a release mechanism configured to decouple the first wheel supporting member and the second wheel supporting member.

23. A vehicle mounted bike carrier according to claim 22, wherein the release mechanism is a lever.

* * * * *